US012215843B2

(12) United States Patent
Reilly et al.

(10) Patent No.: US 12,215,843 B2
(45) Date of Patent: Feb. 4, 2025

(54) TRACK LIGHT WITH INTEGRAL UPLIGHT SYSTEM

(71) Applicant: Lucifer Lighting Company, San Antonio, TX (US)

(72) Inventors: Jack Reilly, San Antonio, TX (US); Brian Beck, Spring Branch, TX (US); Anuj Maloo, San Antonio, TX (US)

(73) Assignee: Lucifer Lighting Company, San Antonio, TX (US)

( * ) Notice: Subject to any disclaimer, the term of this patent is extended or adjusted under 35 U.S.C. 154(b) by 0 days.

(21) Appl. No.: 18/644,237

(22) Filed: Apr. 24, 2024

(65) Prior Publication Data

US 2024/0377048 A1 Nov. 14, 2024

Related U.S. Application Data

(60) Provisional application No. 63/465,132, filed on May 9, 2023.

(51) Int. Cl.

| | |
|---|---|
| ***F21V 21/005*** | (2006.01) |
| ***F21S 4/28*** | (2016.01) |
| ***F21S 8/06*** | (2006.01) |
| ***F21V 11/18*** | (2006.01) |
| ***F21V 21/008*** | (2006.01) |
| ***F21V 21/03*** | (2006.01) |
| ***F21V 21/30*** | (2006.01) |
| ***F21V 21/34*** | (2006.01) |
| ***F21Y 103/10*** | (2016.01) |
| ***F21Y 113/20*** | (2016.01) |
| ***F21Y 115/00*** | (2016.01) |

(52) U.S. Cl.

CPC .............. *F21V 21/005* (2013.01); *F21S 4/28* (2016.01); *F21S 8/061* (2013.01); *F21S 8/066* (2013.01); *F21V 11/186* (2013.01); *F21V 21/008* (2013.01); *F21V 21/03* (2013.01); *F21V 21/30* (2013.01); *F21V 21/34* (2013.01); *F21Y 2103/10* (2016.08); *F21Y 2113/20* (2016.08); *F21Y 2115/00* (2016.08)

(58) Field of Classification Search

CPC ...... F21V 21/005; F21V 21/008; F21V 21/03; F21V 21/30; F21V 21/34; F21S 8/061; F21S 8/066; F21S 4/28; E04F 13/074; E04F 2290/026

USPC .......................................................... 362/648

See application file for complete search history.

(56) References Cited

U.S. PATENT DOCUMENTS

2013/0279180 A1* 10/2013 Pearson .................... F21S 2/00
362/373

FOREIGN PATENT DOCUMENTS

KR 20180072095 A * 6/2018
KR 20230002373 U * 12/2023

* cited by examiner

*Primary Examiner* — Laura K Tso

(74) *Attorney, Agent, or Firm* — Harness, Dickey & Pierce, P.L.C.

(57) ABSTRACT

A light fixture has an elongated track comprising an upper channel comprising a first wall having a first slot and a second wall having a second slot. The assembly has a support assembly comprising a base and a swivel arm rotatably attached to the base at a swivel. The base comprising a first flange received in the first slot and a second flange received in the second slot, said base extending across the upper channel. The swivel arm has a first end and a second end. The swivel is disposed at the first end and a cable connector is disposed at a second end of the swivel arm. The cable connector receives a cable therein.

23 Claims, 12 Drawing Sheets

TRACK LIGHT WITH INTEGRAL UPLIGHT SYSTEM

CROSS-REFERENCE TO RELATED APPLICATION

This application claims the benefit of U.S. Provisional Application No. 63/465,132, filed on May 9, 2023. The entire disclosure of the above application is incorporated herein by reference.

FIELD

The present disclosure relates generally to track lighting and, more particularly, to a hanging track light that has an uplight integrated therewith.

BACKGROUND

This section provides background information related to the present disclosure which is not necessarily prior art.

Track lighting is used around home and commercial settings for illuminating various spaces. A track light has a track into which light fixtures are mounted. The track is coupled to a power source and powers the lights that are placed within the track. Track lights are often mounted on a ceiling surface. However, track lights may also be mounted in a hanging configuration. The light fixtures that hang from the track often cause the track to tilt out of the desired position. For example, when a track light is hung adjacent to a wall and an angularly directed light is used to illuminate the wall, all of the centers of gravity of the light fixtures are biased in the same direction and may cause the track to tilt. A tilt track is undesirable from an aesthetic standpoint.

Another issue with hanging track lights is that the ceiling above the track light is usually in a shadow or is dark. Often times, the fixtures that hang from a track are directional in nature and point in a downward direction or as mentioned above, in a sideward direction toward a wall. In some situations, it is desirable to illuminate the ceiling as well. However, other fixtures must be provided to illuminate the ceiling.

SUMMARY

This section provides a general summary of the disclosure and is not a comprehensive disclosure of its full scope or all of its features.

The present disclosure provides a system that allows a hanging track to be balanced as well as an uplight directed toward a ceiling. Advantageously, a plurality of tracks may be coupled together to form an aesthetically pleasing configuration.

In addition, an integral power feed or driver configuration is set forth. The integral power feed or driver is disposed in a canopy housing assembly to allow the power driver to easily be replaced when needed. That is, typically when a power feed or driver has to be replaced, the position of the driver at the ceiling is typically in a very high position and is difficult to reach. In some instances, the driver is within a wall or ceiling. Therefore, ceiling or wall repairs are required. The present disclosure allows the cover plate to be removed and the driver to be retained in place until the mounting arm is removed. A mounting arm also allows the support cable for the light fixture to be retained while the power feed or driver is replaced.

In one aspect of the disclosure, a light fixture has an elongated track comprising an upper channel comprising a first wall having a first slot and a second wall having a second slot. The assembly has a support assembly comprising a base and a swivel arm rotatably attached to the base at a swivel. The base comprising a first flange received in the first slot and a second flange received in the second slot, said base extending across the upper channel. The swivel arm has a first end and a second end. The swivel is disposed at the first end and a cable connector is disposed at the second end of the swivel arm. The cable connector receives a cable therein.

In another aspect of the disclosure, a canopy housing assembly for an electrical component includes a housing comprising an outer wall, a bracket coupled to the housing, and a mounting arm comprising a first end and a second end. The first end is rotatably coupled to the housing. The mounting arm further comprises a cable mount coupled between the first end and the second end of the mounting arm coupling a cable to the mounting arm. The mounting arm has a latched position and an unlatched position and a plurality of positions therebetween. The second end is positioned between the electrical component and the bracket in the latched position, the unlatched position, and the plurality of positions therebetween.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

1A

Figure 1A:
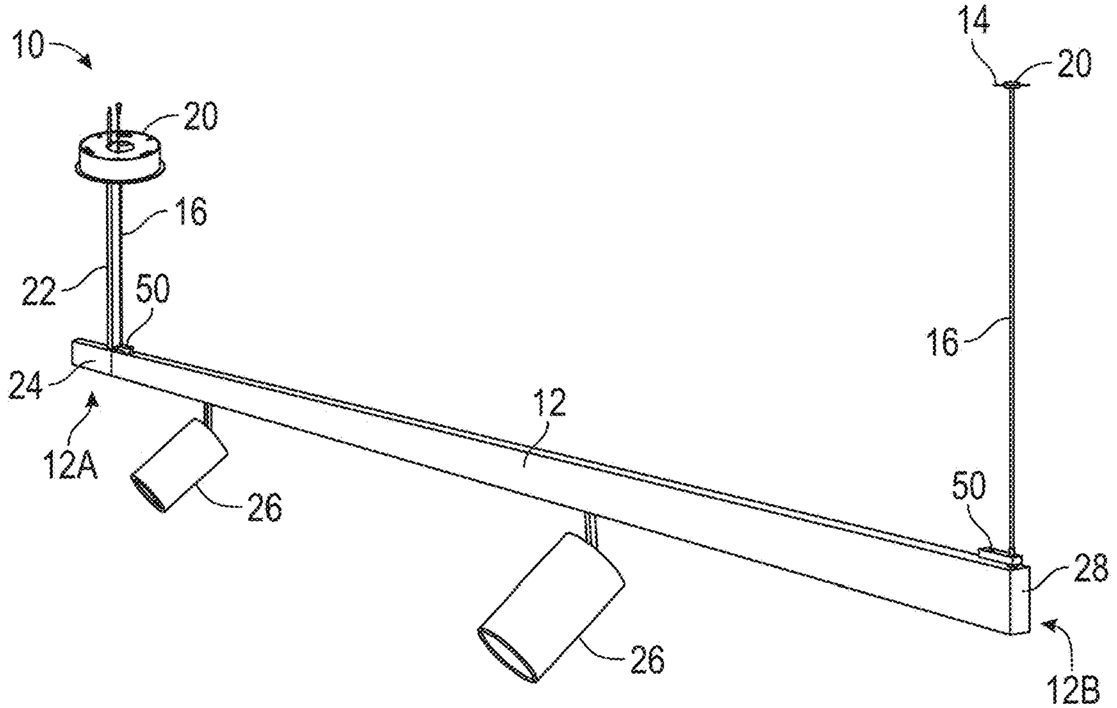
FIG. 1A is a perspective view of the light fixture assembly.
Figure 1B:
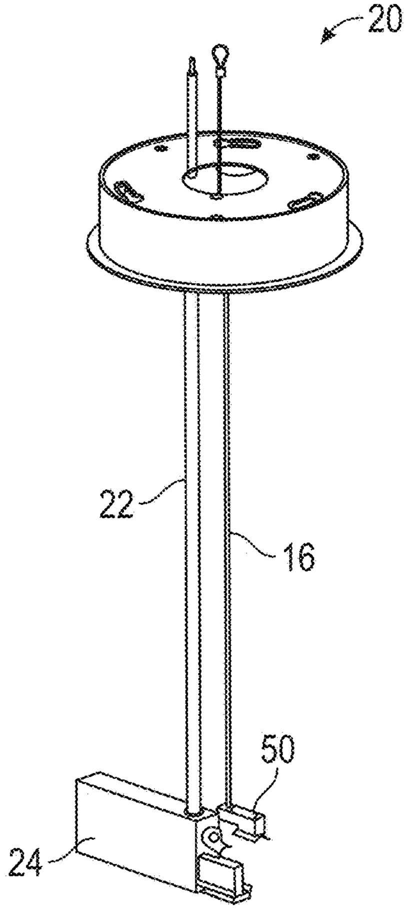
FIG. 1B is a perspective view of a canopy housing and power coupler for coupling to one end of the light fixture assembly.
Figure 1C:
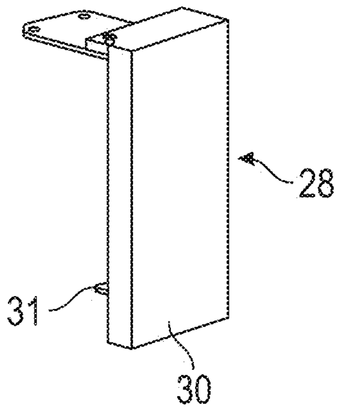
FIG. 1C is a perspective view of an end cap for the light fixture assembly.
Figure 1D:
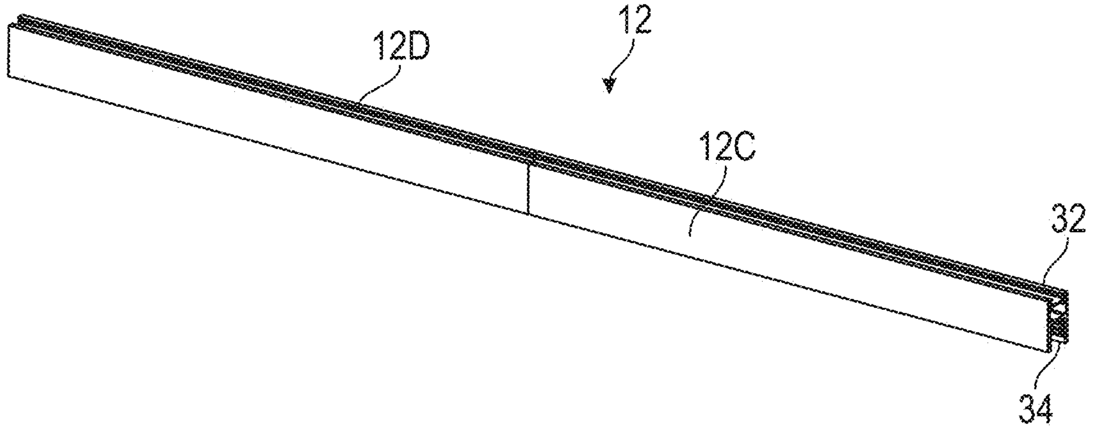
FIG. 1D is a perspective view of the track of the light fixture assembly of FIG. 1A.
Figure 1E:
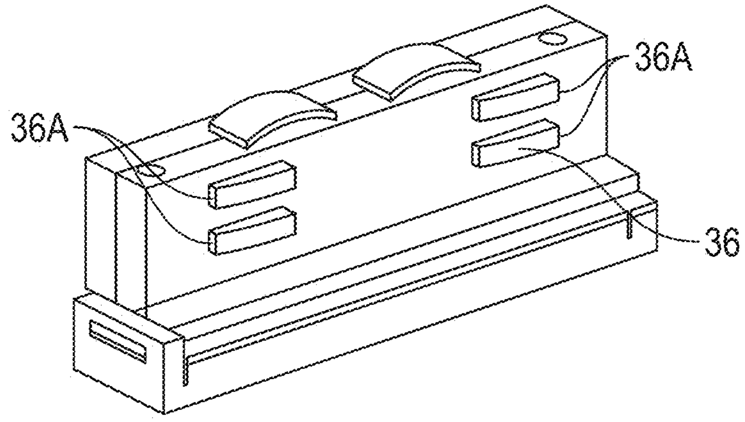
FIG. 1E is an inline connector for connecting multiple tracks.
Figure 1F:
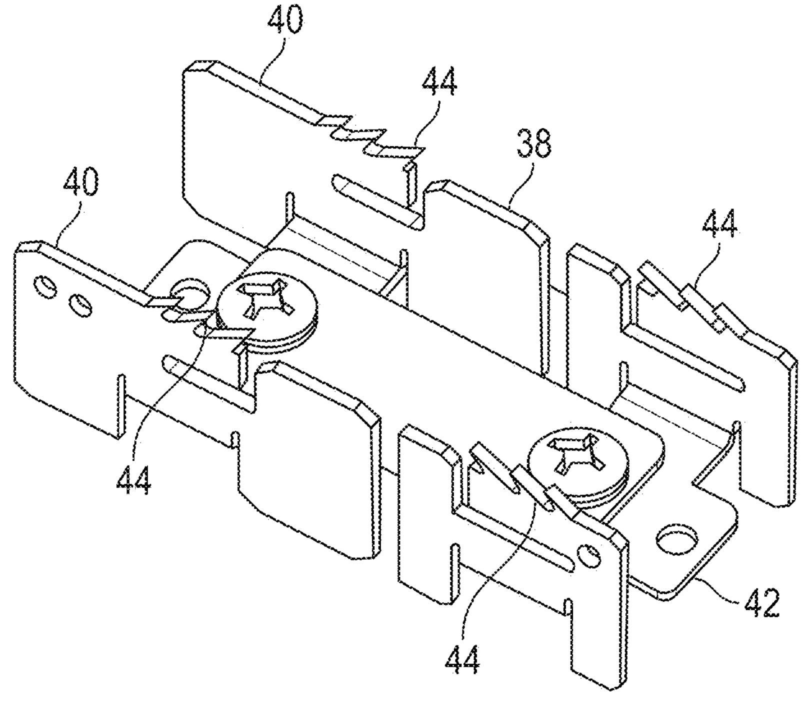
FIG. 1F is a perspective view of a joiner for joining consecutive tracks.
Figure 1G:
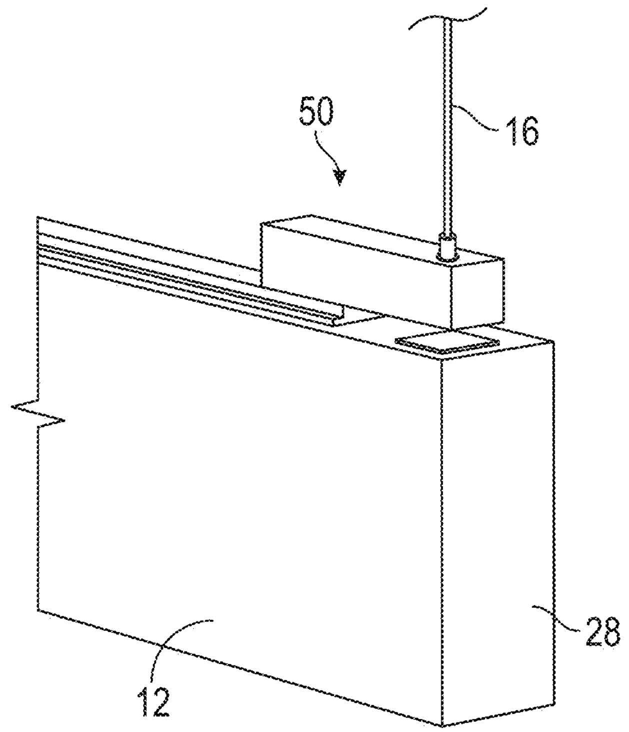
FIG. 1G is an enlarged end view of the light fixture assembly of FIG. 1A.
Figure 1H:
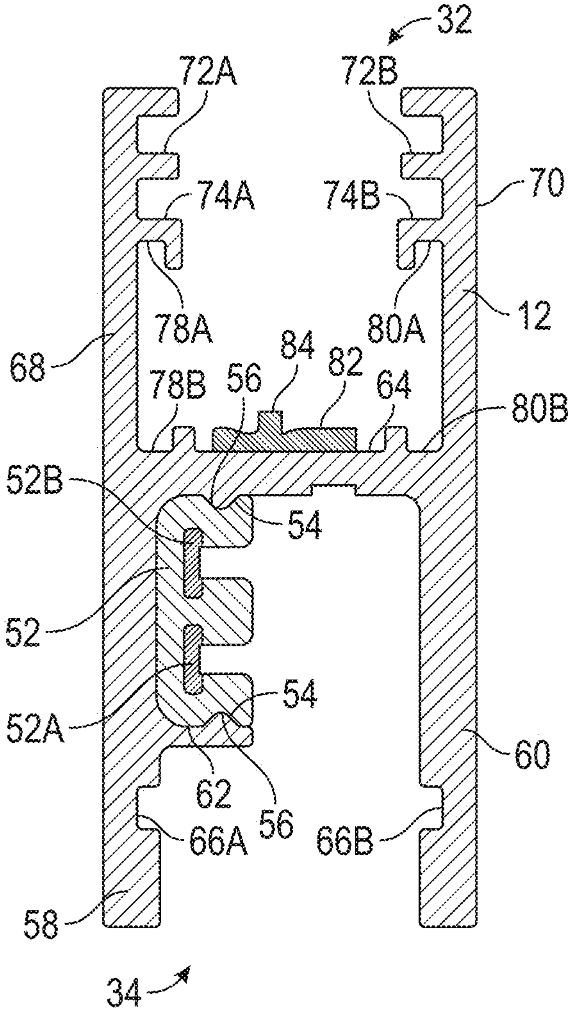
FIG. 1H is a section view of the track.
Figure 1I:
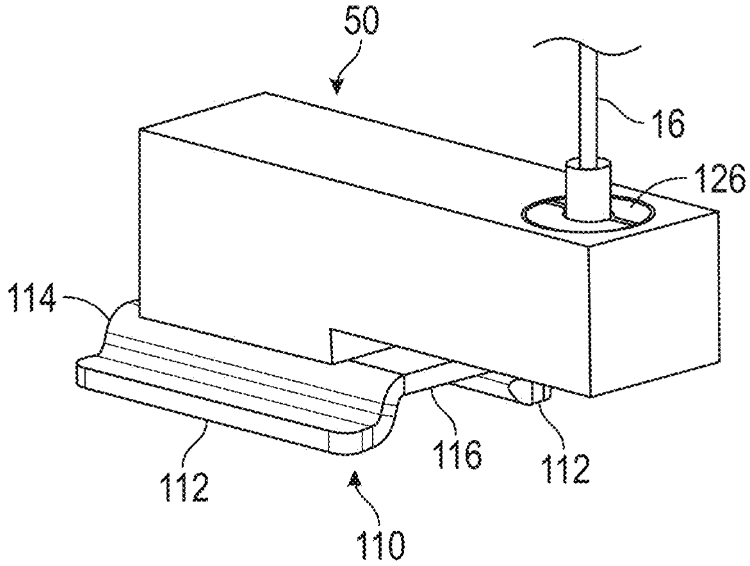
FIG. 1I is a perspective view of the swivel support assembly of FIG.
Figure 1J:
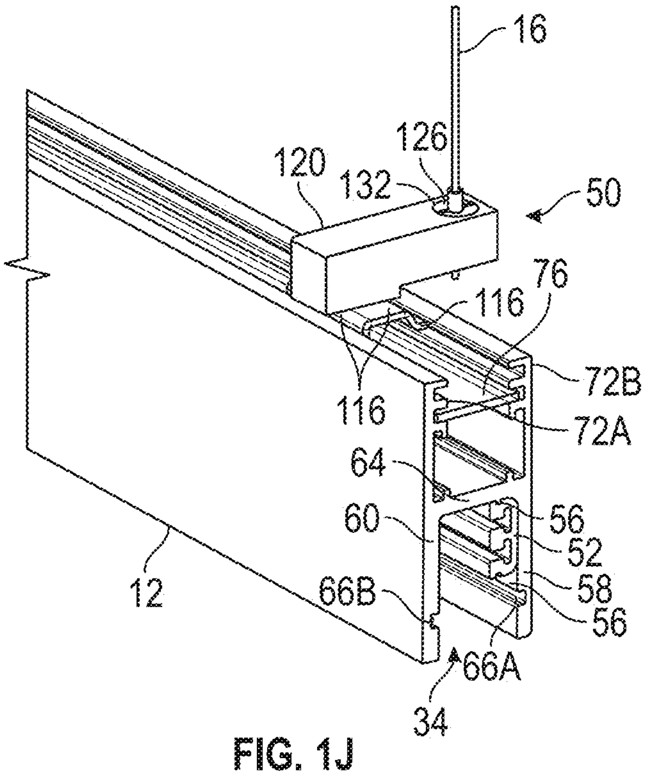

FIG. 1J is a perspective view of the light fixture assembly of FIG. 1A having the support assembly 90° to the track.

Figure 1K:
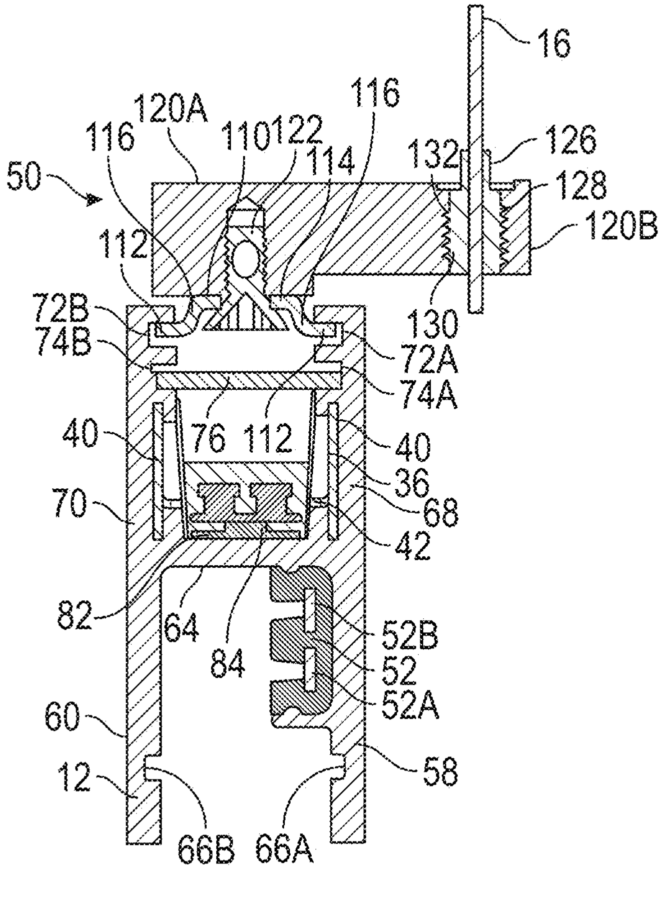

FIG. 1K is a cross-sectional view of the track and support assembly at the swivel.

Figure 2A:
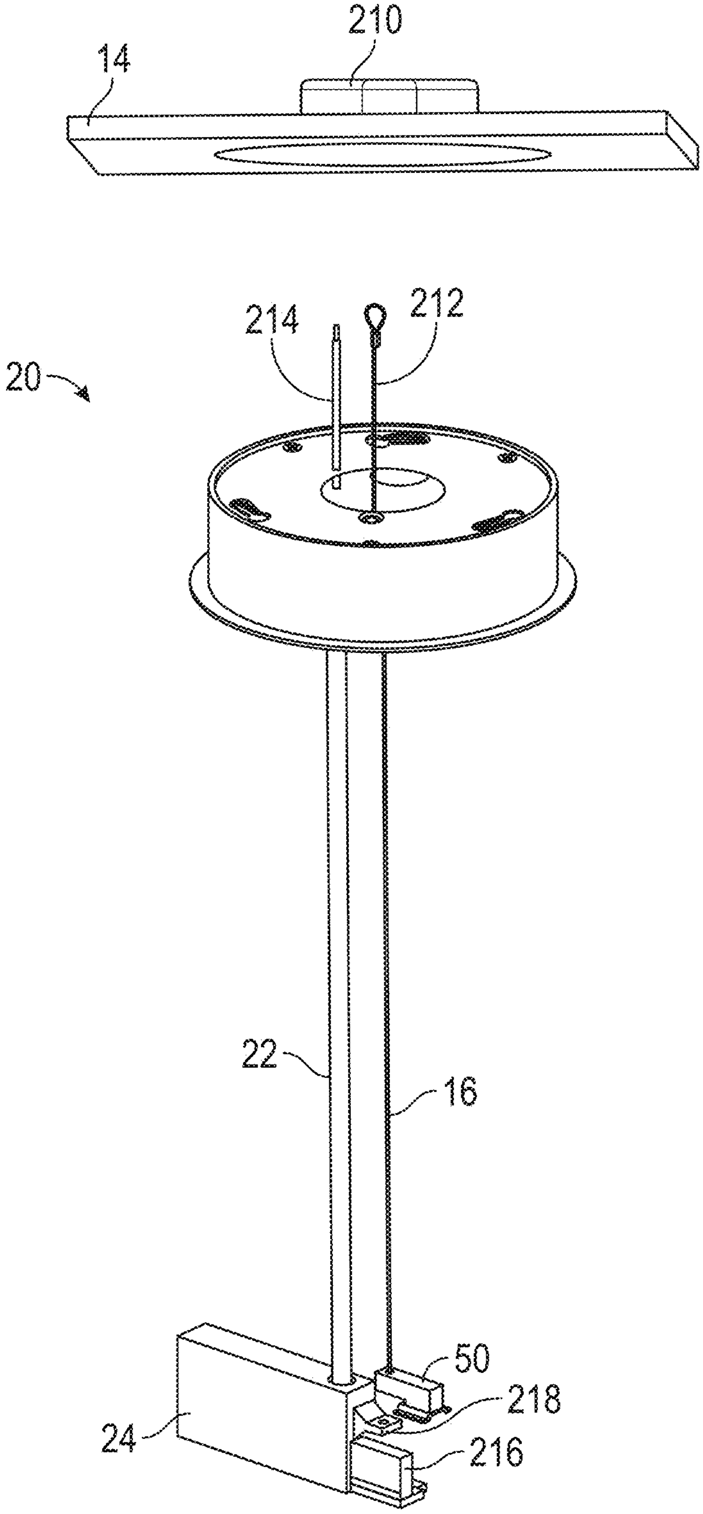

FIG. 2A is a perspective view of a power coupler for a light fixture assembly coupled to the canopy housing assembly.

Figure 2B:
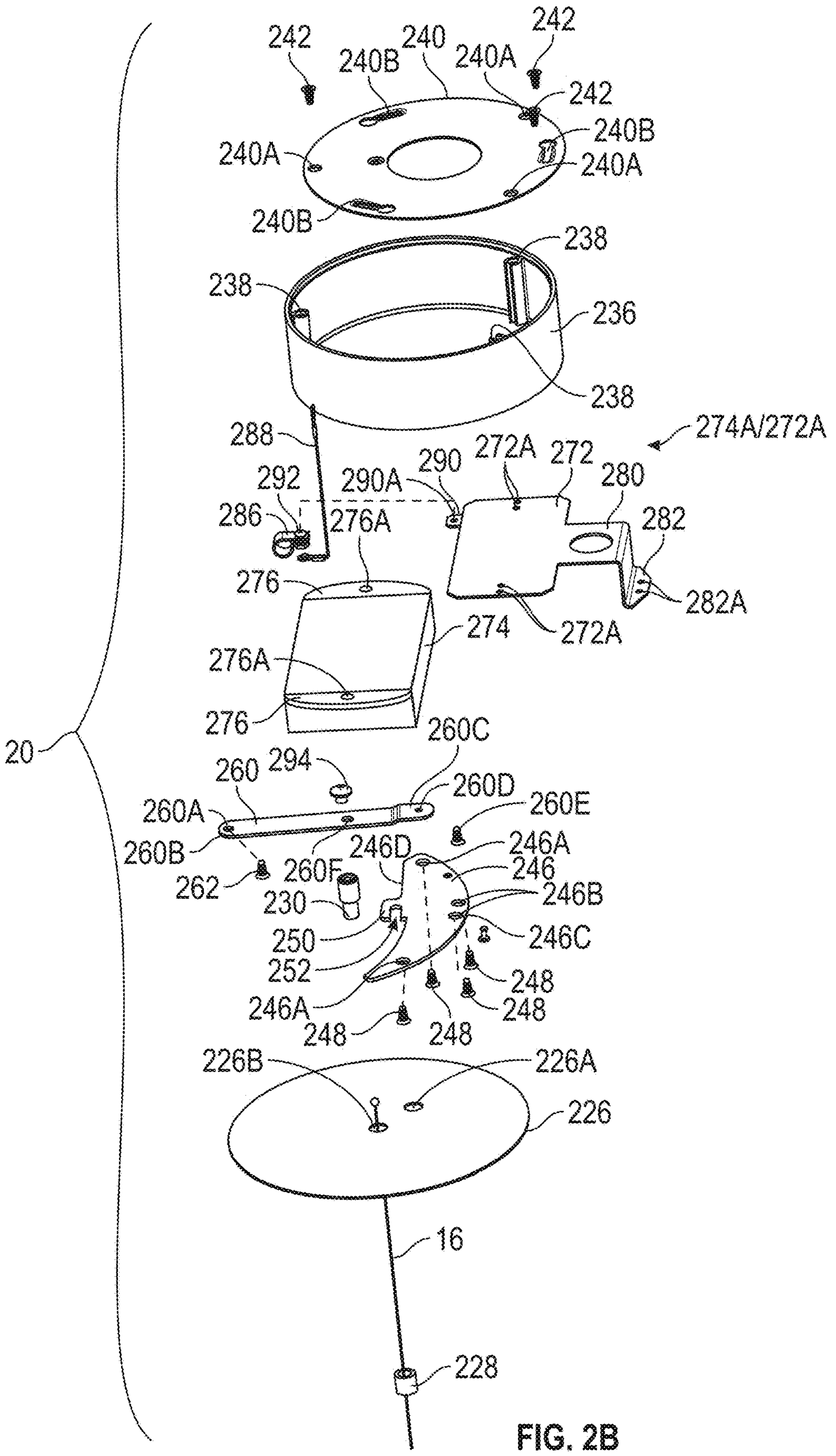

FIG. 2B is an exploded view of the canopy housing.

Figure 2C:
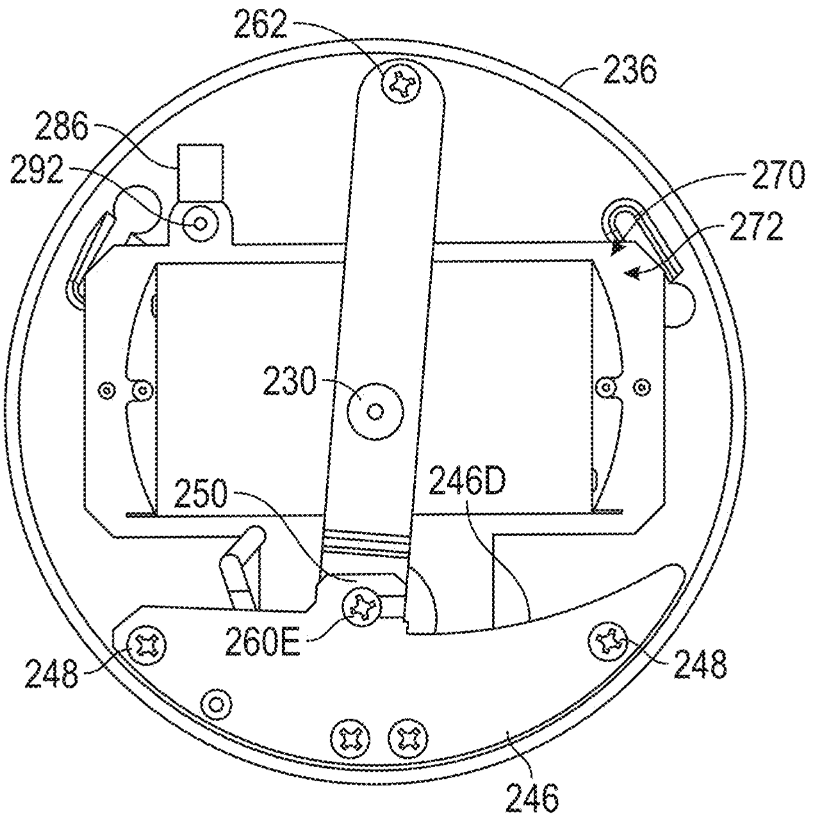

FIG. 2C is a bottom view of the canopy housing in a latched position.

Figure 2D:
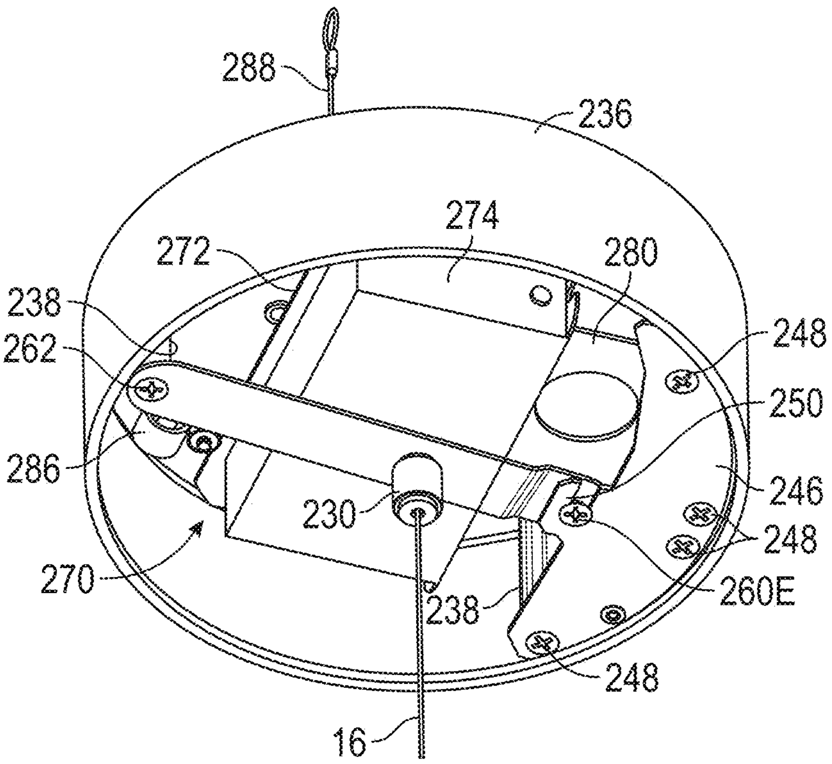

FIG. 2D is a perspective view of the housing in the latched position.

Figure 2E:
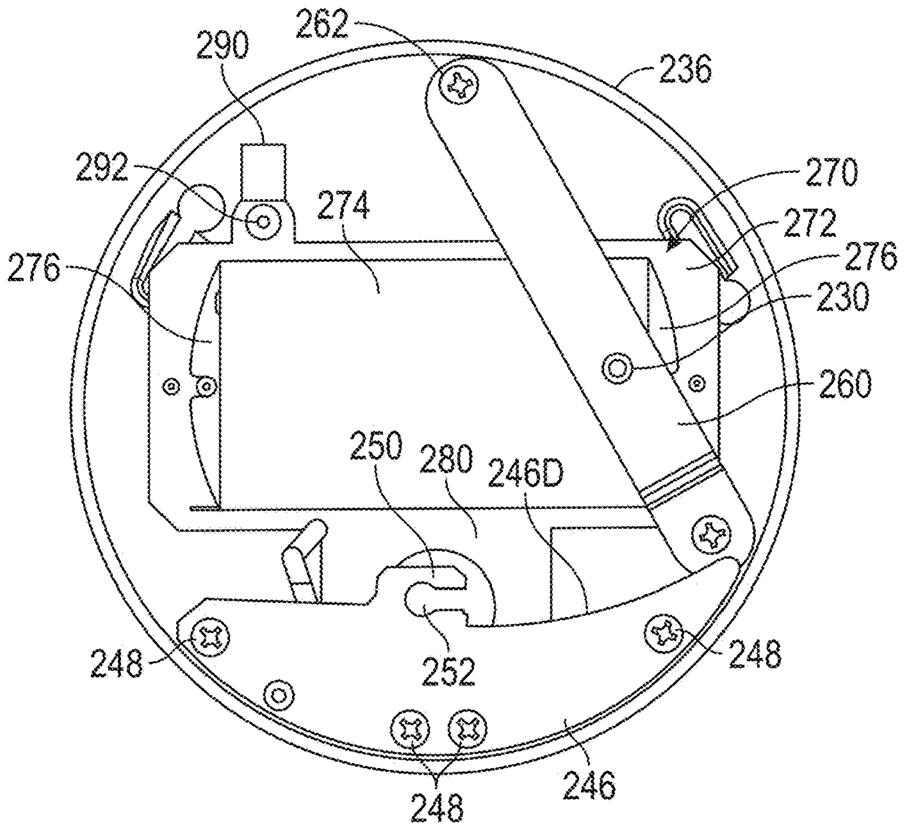

FIG. 2E is a bottom view of the housing in the unlatched position.

Figure 2F:
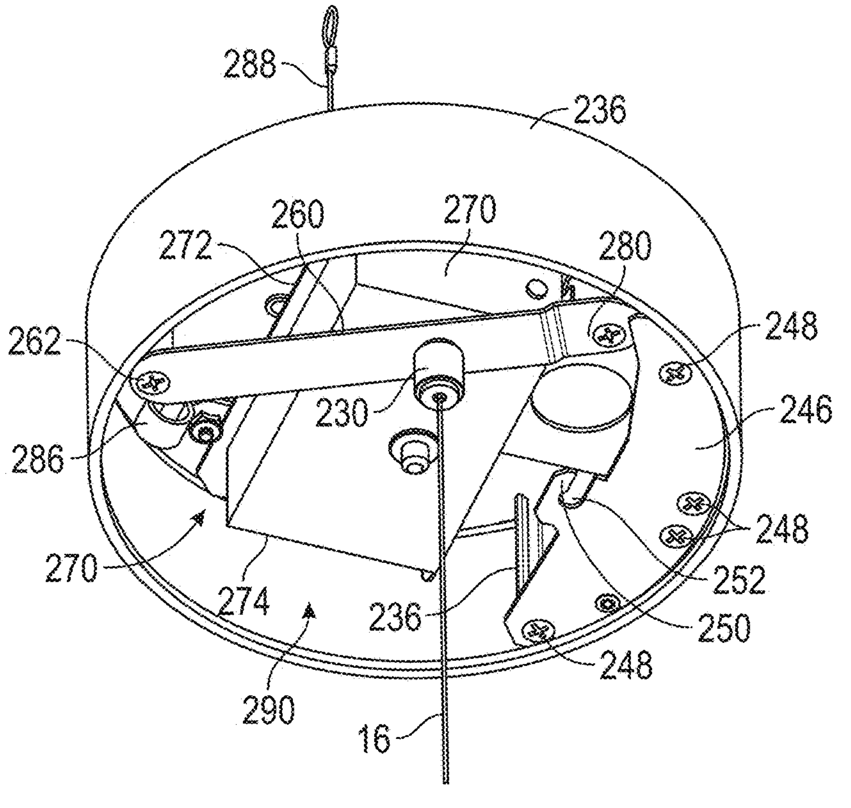

FIG. 2F is a perspective view of the housing in the unlatched position.

Figure 2G:
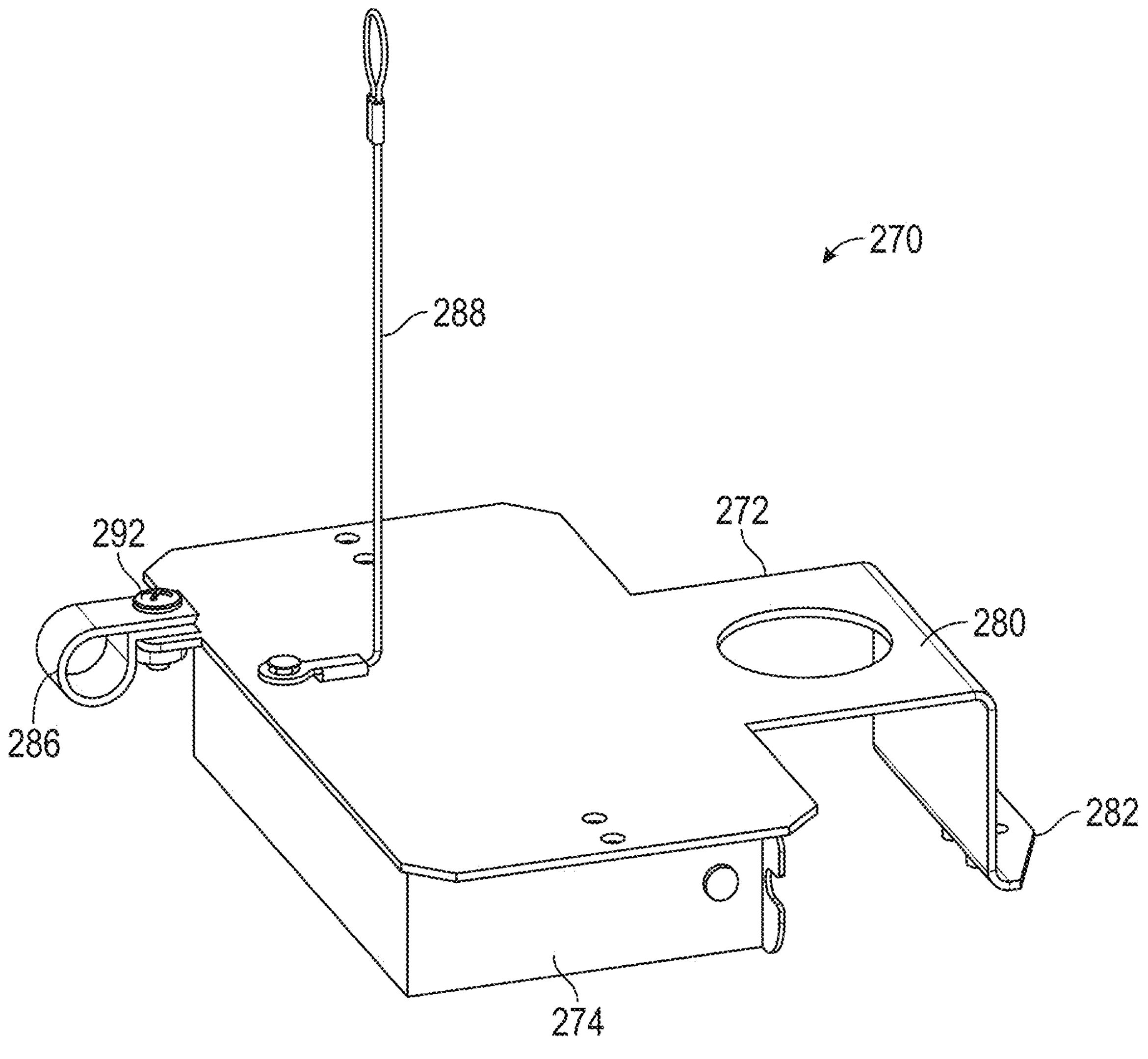

FIG. 2G is a perspective view of a driver plate assembly.

Figure 3A:
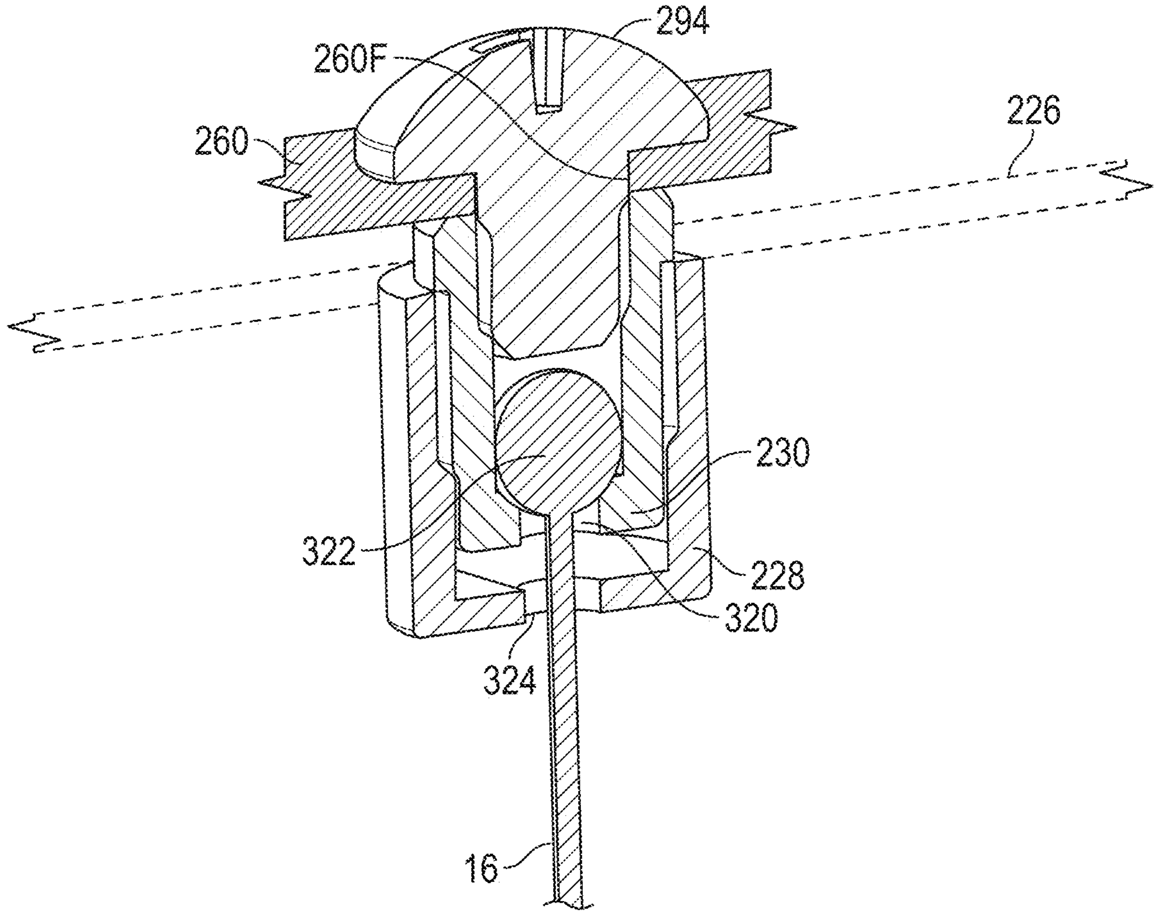

FIG. 3A is a cross-sectional perspective view of the coupler.

Figure 3B:
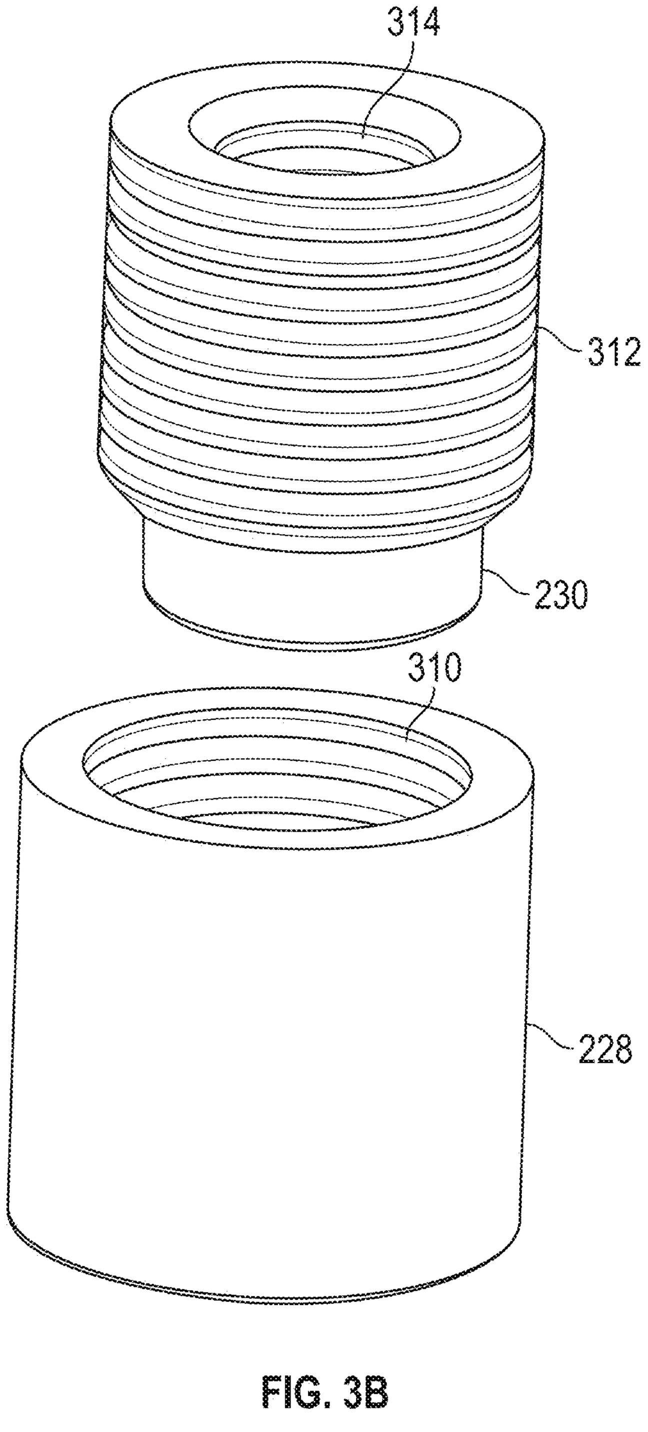

FIG. 3B is an exploded view of the inner coupler relative to the outer coupler.

Corresponding reference numerals indicate corresponding parts throughout the several views of the drawings.

DETAILED DESCRIPTION

Example embodiments will now be described more fully with reference to the accompanying drawings.

Referring to FIGS. 1A-1K, light fixture assembly 10 is illustrated. The light fixture assembly 10 comprises a track 12 that is suspended from a ceiling 14 by a pair of cables 16. The cables 16 are mounted to the ceiling at a canopy housing assembly 20. Each cable 16 is coupled to a respective canopy housing assembly 20 as illustrated. Power is provided from one of the canopy housing assemblies 20 through a power cable 22. The power cable 22 is disposed at a first end 12A of the track. The track has two ends 12A and 12B, the first end 12A may have a power coupler that provides alternating currents (AC) voltage and direct current (DC) voltage to the track as described in greater detail below. The track may therefore have low voltage DC and higher voltage AC voltage available to power light fixtures. AC voltage may be used to power pendant 26. The pendant 26 is coupled to the track and AC power.

The second end 12B of the track 12 has an end cap 28. The end cap 28 has a smooth surface 30 that is exposed and may be painted or formed of the same material as the track 12 to blend in. The end cap 28 has extensions 31 that extend into the track to secure the end cap 28 thereto.

Referring now to FIGS. 1D, 1E and 1F, the track has an upper channel 32 and a lower channel 34. In FIG. 1D, the track is formed from two adjacent tracks 12C, 12D joined together. When more than one track 12 is used together, an inline connector 36 is used to couple power between the lower channels 34 of adjacent tracks. As will be described in greater detail below, a power bus (52 of FIG. 1H) may be located within the lower channel 34 and the inline connector 36 couples to the buses of adjacent tracks 120, 12D.

A joiner 38 may be used to couple adjacent tracks 12C, 12D together. The joiner 38 may have vertical walls 40 and a horizontal wall 42 coupled between the vertical walls 40 that are sized to be received within the upper channel 32. The horizontal wall 42 may be positioned above the vertical wall 40 to allow the joiner 38 to be positioned within the upper channel 32. Teeth 44 are positioned on the top edge of the vertical walls 40 so that a friction fit is formed so that the joiner 38 securely joins two adjacent tracks 12C, 12D.

The inline connector 36 has exposed conductors 36A to couple both polarities of the AC power between adjacent tracks 12C, 12D.

Referring now specifically to FIGS. 1A and 1G, a support assembly 15 is located at one or both of the ends 12A, 12B of the track 12. The support assembly 50 couples the cable 16 to the canopy housing assembly 20. The cable 16 is strong and thin and may be referred to as an aircraft wire or aircraft cable. The cable 16 may be a braided metallic cable. The cable may be painted or form of other materials as well.

The cable has a strength sized to support the track and pendant 26 that extend therefrom.

The support assembly 50 may be swiveled to allow the track to maintain a vertical angle while hanging. Because the track 12 may be used for supporting various numbers of pendant assemblies 26, by swiveling the support assemblies 50, the track 12 may be balanced and positioned in a vertical position.

Referring now also to FIGS. 1H, 1I, 1J and 1K, details of the track 12 are set forth. The lower channel 34 includes a bus 52 that has a first conductor 52A and a second conductor 52B. The conductors 52A and 52B provide alternating current to pendants 26 that are coupled to the track 12. Of course, the conductors 52A, 52B may also provide direct current voltage. The bus 52 has grooves 54 that engage ridges 56 within the lower channel 34. The lower channel 34 is formed from a first lower channel wall 58 and a second lower channel wall 60 both of which have an inside surface and an outside surface. When the light fixture assembly 10 is installed, the goal is to have the lower walls 58 and 60 in a vertical direction. The lower wall 58 may have an extension 62 that extends perpendicularly from the lower wall 58 toward the lower wall 60. One of the ridges 56 may be disposed thereon. A horizontal wall 64 is used to separate the upper channel 32 and the lower channel 34. The bottom surface of the wall 64 may also have a ridge 56 extending therefrom. As mentioned above, the ridges 56 may be aligned so that grooves 54 in the bus 52 hold the bus 52 in place. The bus 52 may be formed of a conformable material, such as plastic, so that the bus 52 flexes so that the grooves 54 may be aligned with the ridges 56. The track 12, as mentioned above, may be formed of a metal material and thus may not be flexible. The lower channel walls 58 and 60 may have opposing slots 66A, 66B therein. The slots may be used to support the end of a pendant 26.

The upper channel 32 has an upper channel wall 68 and an upper channel 70 that are spaced apart and coupled to the horizontal wall 64. The upper channel wall 68 and the upper channel wall 70 are vertical walls when the light fixture assembly 10 is installed properly without tilt. In this example, the track 12 has an "H-shaped" cross section. The lower channel wall 58 and the upper channel wall 68 are co-extensive and co-planar. Likewise, the lower channel wall 60 and the upper channel wall 70 are co-extensive and co-planar. It should be noted, however, that the width of the upper channel 32 and the lower channel 34 may be different and therefore the walls 58, 68 and 60 and 70 may not be coplanar.

The upper channel 32 has various features built therein. The upper channel 32 has a first pair of opposing slots 72A, 72B located near the upper end of the upper channel wall 68, 70. The opposing slots 72A, 72B in this example are on the same plane, extend perpendicular to the walls 68, 70 and are used to receive the support assembly 50. That is, the opposing slots 72A, 72B receive at least a portion of the support assembly 50 for supporting the track 12. When installed properly, the opposing slots 72A, 72B are horizontal.

A second set of opposing slots 74A, 74B are located directly opposite each other and extend from the inside of the walls 68, 70. The slots 74A, 74B are coplanar and may be used to receive a lens 76 as illustrated in FIG. 1J. The lens 76 may be planar and have a thickness just less than the slots so that lens 76 may be received therein. The lens 76 may be formed of plastic and may be frosted or colored to provide a desired effect. The lens 76 may also have optical features formed herein. During assembly, the lens 76 may be slid down the opposing slots 74A, 74B from one end of the track 12 until a desired position is reached.

Opposing vertical slots 78A, 78B may be formed on the inside of the walls 68. Likewise, opposing vertical slots 80A, 80B are formed on the inside surface of the upper channel wall 70. The opposing vertical slots 78A, 78B and 80A, 80B are used to receive the vertical walls 40 of the joiner 38. The upper opposing vertical slots 78A and 80A may engage the teeth 44 disposed on the vertical walls 40. The position of the joiner 38 within the opposing vertical slots 78A, 78B, 80A, and 80B is best illustrated in FIG. 1K.

A light emitting diode strip 82 having light emitting diodes (LEDs) 84 disposed thereon. Although a LED strip 82 is illustrated, other types of light sources and ways to position the light sources may be provided within the upper channel 32.

As is best illustrated in FIGS. 1I, 1J and 1K, the support 50 provides a swivel 124 that allows the cable 16 to be positioned in various positions relative to the track 12.

The support 50 has a base 110 that has flanges 112 extending therefrom. The flanges 112 are received in the opposing slots 72A, 72B. The base 110 may be formed of a stamped metal or form of a molded composite material. The thickness of the flanges 112 are sized to be received within the opposing slots 72A, 72B. The base 110 has a horizontal portion 114 and a pair of walls 116 that join the horizontal portion. The walls 116 position the top surface of the horizontal portion 114 above the track 12.

The support assembly 50 has a swivel arm 120 that is rotatably coupled to the base 110 and more specifically to the horizontal portion 114 of the base 110. A fastener 122 extends through the horizontal portion 114 of the base 110 to rotatably couple the swivel arm thereto. Although a screw is illustrated as the fastener 122, other types of fasteners such as pins, rivets, shafts, and the like may be employed.

In this example, the swivel arm 120 is formed of metal, such as aluminum, and has a rectangular cross section in this example. The swivel arm 120 has a first end 120A and a second end 120B. The first end 120A is positioned adjacent to the fastener 122. The second end 120B is adjacent to the cable 16. The first end 120A of the swivel arm 120, the fastener 122 and the base form a swivel 124

The cable 16 is secured to the second end 120B of the swivel arm 120 using a cable connector 126. The cable connector 126, in this example, has threads 128 that couple to threads 130 within the opening 132 of the swivel arm 120. That is, as the cable connector 126 is tightened, the cable connector 126 tightens around the cable 16 so that the cable 16 is securely retained therein.

During assembly, one or two support assemblies 50 are received within the opposing slots 72A and 72B of the track 12. The flanges 112 may be inserted within the opposing slots 72A, 72B and positioned where desired. The pendant assemblies 26 may then be coupled to the lower channel 34 and positioned as desired. To maintain the vertical aspect of the track 12, the position of the swivel arm 120 is changed. The second end 120B of the swivel arm with the cable 16 may be positioned at various angles including parallel to the track 12, perpendicular to the track 12 or at various angles in between. The position of the swivel arm 120 may therefore control the angle of the track relative to the vertical direction. Alignment of the track 12 in a vertical orientation is typically desirable. Both ends of the track may be adjusted. However, a fixed support 50 may be provided at one of the ends of the track 12. It should be noted that the support assembly may be positioned at various locations relative to the track 12. Further, the swivel arm 120 may be disposed or swiveled in any position relative to the fastener 122. That is, the swivel arm may rotate 360° relative to the base 110.

Referring now to FIGS. 2A-2G, the canopy housing assembly 20 is illustrated in further detail. In FIG. 2A, a portion of a ceiling is illustrated with a junction box 210. The junction box 210 may be an existing box installed within the ceiling 14. The junction box 210 may be sized to receive the canopy housing assembly 20. A safety cable 212 may secure the canopy housing assembly 20 to the junction box 210. A ground wire 214 extends from the canopy housing assembly 20.

As mentioned above, the cable 16 may be used for supporting one end of the track. The power cable 22 may not be used for supporting weight. Power from the canopy housing assembly 20 is communicated through the power cable 22 to the power coupler 24. Both DC and AC power or voltage is provided to the power coupler in this example. AC power may be provided to the lower channel 34 through a connector 218 may power LEDs within the upper channel 32 using DC power. The wire 16 is coupled to a support assembly 50 and is received within the track 12 as described above. For simplicity, the track 12 is not illustrated so that the connectors 216 and 218 are illustrated.

FIG. 2B shows an exploded view of the canopy housing assembly 20. The canopy housing assembly 20 has a cover 226 that has two openings 226A and 226B therethrough. In some examples, only one opening is provided. Opening 226A may receive the power cable 22. Opening 226B receives the cable 16. The cover 226 is removed by loosening the outer coupler 228 from the inner coupler 230. Details of the outer coupler 228 and the inner coupler 230 will be described in greater detail below.

The canopy housing assembly 20 has a housing 236 that has fastener channels 238 integrally formed therein. The housing 236 and the fastener channels 238 may be formed of a composite material. In this example, three fastener channels 238 are evenly spaced around the housing 236 on the inside wall thereof. The fastener channels 238 may be spaced at various spacings and a different number of fastener channels 238 may be provided. The fastener channels 238 allow fasteners to be placed in either end of the fastener channel 238 as described below. Although a cylindrical housing 236 is illustrated, various shapes of housings may be used without departing from the scope of the invention. The housing 236 has a top cover. The top cover 240 and the housing 236 are received within the junction box 210 illustrated in FIG. 2A. The top cover 240 is secured to the housing 236 by coupling fasteners 242 through the top cover, and more specifically, the fastener openings 240A that align with the fastener channels 238.

The housing 236 has a bracket 246 coupled thereto. The bracket 246 is secured to two fastener channels 238 of the housing 236 by fasteners 248 that extend through openings 246A. Other fastener openings 246B extend through the bracket 246, the function of which will be described in greater detail below. The bracket 246 has a curved edge 246C that corresponds to the curvature of the housing 236. Should the housing be a different shape, the edge 246C may also be different shaped in a corresponding manner. The bracket 246 has a second edge 246D opposite the edge 246C. The edge 246D has latch 250 that extends therefrom. In this example, the latch 250 is C-shaped. The latch 250 forms a channel 252.

A mounting arm 260 is used for securing the cable 16 to the canopy housing assembly 20. The mounting arm 260 is rotatably coupled to one of the fastener channels 238 with a fastener 262 through an opening 260A at a first end 260B of the mounting arm 260. A second end 260C of the mounting arm 260 has an opening 260D that may also be used to receive a fastener 260E therein. The fastener 260E may not be fully extended into the opening 260D so that the fastener 260E acts as a pin that is engaged and disengaged from the latch 250. Although a screw is illustrated as the fasteners 260E, a rivet pin or other type of extension may be used to engage the latch 250.

Referring now also to FIG. 2G, a driver plate assembly 270 is disposed within the housing 236. The driver plate assembly 270 has a driver plate 272 that secures a driver 274 thereto. The driver 274 may convert alternating current to direct current for powering the light emitting diodes within the upper channel 32 of the track 12 as mentioned above. The driver 274 may have flanges 276 that have an opening 276A. The driver plate 272 also has openings 274A, two of which align with the openings 276A on either side of the driver 274. A screw or other type of removable fastener may be used to fasten the driver 274 through the openings 276A and into the openings 272A through the driver plate 272. This allows the driver 274 to be removed and replaced when desired. The driver plate assembly 270 and the driver plate 272 have an L-shaped bracket 280 coupled thereto. The L-shaped bracket 280 may be integrally formed with the driver plate 272. The L-shaped portion of the bracket 280 as a flange 282 that has openings 282A therethrough. The flange 282 is secured to the inner side of the bracket 246 using fasteners 248 through the openings 246B. That is, two of the fasteners 248 extend through the bracket at the openings 248B and into the openings 282A of the flange 282. The "L-shape" of the bracket 280 is provided because the driver plate 272 is on the opposite side of the driver 274 from the bracket 246.

The driver plate 272 has a ground mount 286 that is coupled to a ground wire 288 that extends into the junction box 210. The ground mount 286 may be used to ground the driver 274 electrically. The ground mount 286, in this this example, is coupled to a ground extension 290 that has an opening 290A for receiving the fastener 292.

To assemble the canopy housing assembly 20 to the junction box, the top cover 240 may be secured to the housing 236 using the fasteners 242. The cover 240 has openings 240B that are used to secure screws to the junction box 210. The driver 274 is secured to the driver plate 272. Likewise, the ground mount 286 is secured to the ground wire 288 of the power within the building. The mounting arm 260 may then be assembled to one of the fastener channels 238 opposite where the bracket 246 is to be placed. The mounting arm 260 may have the inner coupler 230 coupled to the mounting arm at the opening 260F using the fastener 294. The second end 260C of the mounting arm 260 is offset from a plane of the second end 260C toward the driver 274 for alignment in this example. The mounting arm 260 is positioned between the driver 274 and the bracket 246. In all positions, the mounting arm 260 is between the driver 274 and the bracket 246. This allows the cable 16 to be supported by the coupler 230 and the weight of the light fixture assembly 10 to be supported thereby.

In FIGS. 2C and 2D, the mounting arm 260 is illustrated in a latched position. In the latched position, coupler 230 is in the center of the circular housing 236. By providing the coupler 230 in the center of the housing 236, a more aesthetically pleasing light fixture is achieved. In FIGS. 2E and 2F, the mounting arm 260 is illustrated in the unlatched position. It should be noted that the second end 260C of the mounting arm 260 is still between the bracket 246 and the driver 274. Therefore, in a plurality of positions between the latched and unlatched position, the mounting arm 260 is supported by the bracket 246 and therefore the light fixture assembly 10 and the track 12 is supported.

In FIG. 2F, a clearance 290 is formed between the housing 236 and the mounting arm 260 in the unlatched position.

Although not illustrated, the driver 274 may have various electrical connectors or wires extending therefrom that correspond to the power cable 22.

Referring now to FIGS. 3A and 3B, the outer coupler 228 is illustrated relative to the inner coupler 230. As mentioned above, the outer coupler 228, once removed from the inner coupler 230, is used to support the cover 226. To access the driver, the outer coupler 228 is unscrewed from the inner coupler 230. The outer coupler 228 has inner threads 310. The inner coupler 230 has outer threads 312. The inner coupler 230 has inner threads 314 that engage the fastener 294. The fastener 294 extends through the opening 260F of the mounting arm 260. The bottom of the inner coupler 230 has an opening 320 for receiving and securing a ball 322 affixed to the cable 16. The outer coupler 228 has an opening 324 for receiving the cable 16 therein.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A light fixture comprising:

an elongated track comprising an upper channel comprising a first wall having a first slot and a second wall having a second slot;

a support assembly comprising a base and a swivel arm rotatably attached to the base at a swivel;

the base comprising a first flange received in the first slot and a second flange received in the second slot, said base extending across the upper channel; and the swivel arm comprising a first end and a second end, wherein the swivel is disposed at the first end and a cable connector is disposed at the second end of the swivel arm, said cable connector receiving a cable therein.

2. The light fixture of claim 1 wherein the first slot is in a same plane as the second slot and the first flange is and second plane are on a second plane.

3. The light fixture of claim 1 wherein the first slot is perpendicular to the first wall and the second slot is perpendicular to the second wall.

4. The light fixture of claim 1 further comprising a third slot aligned with a fourth slot.

5. The light fixture of claim 4 further comprising a lens disposed in the third slot and the fourth slot.

6. The light fixture of claim 1 further comprising a plurality of light emitting diodes disposed in the upper channel.

7. The light fixture of claim 1 wherein the cable is coupled between the swivel arm and a canopy housing assembly at a first end of the track and the first end of the track is coupled to a power cable.

8. The light fixture of claim 7 wherein the track comprises a lower channel, said power cable coupling direct current voltage to the upper channel and alternating voltage to the lower channel.

9. The light fixture of claim 7 wherein the canopy housing assembly comprises a housing comprising an outer wall;

a bracket coupled to the housing;

a mounting arm comprising a first end and a second end, said first end rotatably coupled to the housing;

said mounting arm comprising a latched position and an unlatched position and a plurality of positions therebetween;

said second end positioned between an electrical component and the bracket in the latched position, the unlatched position, and the plurality of positions therebetween.

10. The light fixture of claim 1 further comprising a second cable coupling the second of the track to a second canopy housing.

11. A canopy housing assembly for an electrical component comprising:

a housing comprising an outer wall;

a bracket coupled to the housing;

a mounting arm comprising a first end and a second end, said first end rotatably coupled to the housing, said mounting arm further comprises a cable mount coupled between the first end and the second end of the mounting arm coupling a cable to the mounting arm;

said mounting arm comprising a latched position and an unlatched position and a plurality of positions therebetween; and said second end positioned between the electrical component and the bracket in the latched position, the unlatched position, and the plurality of positions therebetween.

12. The canopy housing assembly of claim 11 further comprising a driver plate coupling the electrical component to the housing.

13. The canopy housing assembly of claim 12 wherein the driver plate comprises a first end coupled to the bracket.

14. The canopy housing assembly of claim 13 wherein the first end of the driver plate comprises an L-shaped and has a flange extending therefrom, said flange coupled to the bracket.

15. The canopy housing assembly of claim 11 wherein the electrical component comprises a driver.

16. The canopy housing assembly of claim 11 wherein in the unlatched position, a clearance is sized for removing the electrical component from the housing.

17. The canopy housing assembly of claim 11 wherein the bracket comprises latch receiving a pin on the second end of the mounting arm in the latched position.

18. The canopy housing assembly of claim 11 wherein the housing comprises a center, said cable mount is aligned with the center when the mounting arm is in the latched position.

19. The canopy housing assembly of claim 11 wherein the cable mount comprises an inner coupler coupled to an outer coupler.

20. The canopy housing assembly of claim 11 wherein the cable mount comprises an inner coupler having outer threads coupled to an outer coupler having inner threads engaging the outer threads.

21. The canopy housing assembly of claim 20 wherein said outer coupler coupling a cover to the housing.

22. A light fixture assembly comprising:

a first canopy housing assembly of claim 21 coupled to a first end of a track by the cable coupled to a support assembly.

23. The light fixture assembly of claim 22 wherein the support assembly comprising a base and a swivel arm rotatably attached to the base at a swivel;

the base comprising a first flange received in a first slot of an upper channel and a second flange received in a second slot of the upper channel, said base extending across the upper channel of the track between the first slot and the second slot; and the swivel arm comprising a first end and a second end, wherein a swivel is disposed at the first end and a cable connector is disposed at a second end of the swivel arm, said cable connector receiving a cable therein.

* * * * *